United States Patent
Mo et al.

(10) Patent No.: US 12,362,797 B2
(45) Date of Patent: Jul. 15, 2025

(54) UPLINK COVERAGE USING JOINT PHASE-TIME ARRAYS

(71) Applicant: Samsung Electronics Co., Ltd., Suwon-si (KR)

(72) Inventors: Jianhua Mo, Allen, TX (US); Ahmad AlAmmouri, Garland, TX (US); Boon Loong Ng, Plano, TX (US); Vishnu Vardhan Ratnam, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 18/149,602

(22) Filed: Jan. 3, 2023

(65) Prior Publication Data
US 2023/0361823 A1   Nov. 9, 2023

Related U.S. Application Data
(60) Provisional application No. 63/338,638, filed on May 5, 2022.

(51) Int. Cl.
*H04B 7/06* (2006.01)
*H04B 7/08* (2006.01)

(52) U.S. Cl.
CPC ........... *H04B 7/0617* (2013.01); *H04B 7/086* (2013.01)

(58) Field of Classification Search
CPC ... H04B 7/0617; H04B 7/086; H04B 7/06952
See application file for complete search history.

(56) References Cited

U.S. PATENT DOCUMENTS

| | | | | |
|---|---|---|---|---|
| 4,021,085 A | * | 5/1977 | Willyard | F16D 3/41 464/131 |
| 5,663,736 A | * | 9/1997 | Webb | H01Q 3/46 250/227.12 |
| 9,445,282 B2 | * | 9/2016 | Chen | H01Q 3/38 |
| 9,906,285 B2 | * | 2/2018 | Ling | H04B 7/0617 |
| 9,967,014 B1 | * | 5/2018 | Park | H04B 7/0452 |
| 10,014,922 B2 | * | 7/2018 | Su | H04B 7/0626 |

(Continued)

FOREIGN PATENT DOCUMENTS

| | | | | |
|---|---|---|---|---|
| CN | 106559114 A | * | 4/2017 | ............ H04B 7/04 |
| CN | 108173578 | * | 1/2018 | ........... H04B 7/0408 |

(Continued)

OTHER PUBLICATIONS

D. Q. Nguyen et al., Joint Delay and Phase Precoding Under True-Time Delay Constraint for THZ Massive MIMO, arXiv, Nov. 2021 (Year: 2021).*

(Continued)

*Primary Examiner* — Berhanu Tadese

(57) ABSTRACT

Methods and apparatuses for uplink (UL) coverage enhancements with joint phase-time arrays (JPTAs). A method for operating a base station (BS) includes identifying criteria associated with a set of user equipments (UEs) in a cell of the BS and determining, based on the criteria, a first subset of the set of UEs to use a JPTA beamforming. The method further includes using the JPTA beamforming for signaling with the first subset of UEs and using an analog beamforming for signaling with a second subset of UEs in the set of UEs.

20 Claims, 11 Drawing Sheets

(56) References Cited

U.S. PATENT DOCUMENTS

| | | | | |
|---|---|---|---|---|
| 10,142,001 B2* | 11/2018 | Ling | ............... | H04B 7/0617 |
| 10,367,620 B2* | 7/2019 | Iyer | ............... | H04L 1/1861 |
| 10,559,880 B1* | 2/2020 | Garrett | ............... | H01Q 1/241 |
| 10,567,066 B2* | 2/2020 | Jeon | ............... | H04B 17/336 |
| 10,574,321 B2* | 2/2020 | Nilsson | ............... | H04B 7/0626 |
| 10,813,125 B2* | 10/2020 | Yi | ............... | H04L 27/26025 |
| 10,841,024 B1* | 11/2020 | Vieira | ............... | H04B 7/0695 |
| 10,868,653 B2* | 12/2020 | Iyer | ............... | H04L 5/0007 |
| 10,911,127 B2* | 2/2021 | Nilsson | ............... | H04B 7/0695 |
| 10,935,584 B2* | 3/2021 | Kong | ............... | G01R 29/0871 |
| 10,951,286 B2* | 3/2021 | Shaban | ............... | H04B 7/0868 |
| 10,999,845 B2* | 5/2021 | Baldemair | ............... | H04L 5/001 |
| 11,006,423 B2* | 5/2021 | Sarajlic | ............... | H04L 25/0212 |
| 11,165,486 B2* | 11/2021 | Loghin | ............... | H04B 7/086 |
| 11,252,591 B2* | 2/2022 | Sarajlic | ............... | H04B 7/0626 |
| 11,323,191 B2* | 5/2022 | Vieira | ............... | H04B 7/0697 |
| 11,374,634 B2* | 6/2022 | Miao | ............... | H04B 7/086 |
| 11,418,972 B2* | 8/2022 | Reial | ............... | H04B 7/0617 |
| 11,569,575 B2* | 1/2023 | Klemmer | ............... | H04B 7/0617 |
| 11,581,979 B2* | 2/2023 | Nimbalker | ............... | H04L 1/0073 |
| 11,616,616 B2* | 3/2023 | Werner | ............... | H04B 7/0894 370/329 |
| 11,652,535 B2* | 5/2023 | Loghin | ............... | H04B 7/0874 370/329 |
| 11,728,859 B2* | 8/2023 | Pezeshki | ............... | H04W 72/51 375/267 |
| 11,728,913 B2* | 8/2023 | Vieira | ............... | H04B 7/0697 375/262 |
| 11,778,659 B2* | 10/2023 | Li | ............... | H04B 7/0695 370/329 |
| 11,792,796 B2* | 10/2023 | Cheng | ............... | H04W 72/20 370/329 |
| 11,877,276 B2* | 1/2024 | Sarajlic | ............... | H04B 7/0408 |
| 11,930,385 B2* | 3/2024 | Sarajlic | ............... | H04B 7/0626 |
| 11,956,050 B2* | 4/2024 | Åström | ............... | H04B 7/0695 |
| 12,150,076 B2* | 11/2024 | Huang | ............... | H04W 56/0015 |
| 2010/0029222 A1* | 2/2010 | Doubchak | ............... | H04B 7/0617 455/101 |
| 2016/0352407 A1* | 12/2016 | Ling | ............... | H04B 7/0617 |
| 2018/0175921 A1* | 6/2018 | Ling | ............... | H04B 7/0617 |
| 2019/0089434 A1* | 3/2019 | Rainish | ............... | H04B 7/086 |
| 2019/0097706 A1* | 3/2019 | Ling | ............... | H04B 7/0617 |
| 2020/0136717 A1* | 4/2020 | Li | ............... | H04B 7/0868 |
| 2020/0374067 A1* | 11/2020 | Vieira | ............... | H04L 27/261 |
| 2021/0126749 A1* | 4/2021 | Iyer | ............... | H04L 5/005 |
| 2022/0029679 A1* | 1/2022 | Pezeshki | ............... | H04B 7/0628 |
| 2022/0070894 A1* | 3/2022 | Parkvall | ............... | H04B 7/0695 |
| 2022/0231751 A1* | 7/2022 | Grant | ............... | H04W 72/21 |
| 2022/0352936 A1* | 11/2022 | Baldemair | ............... | H04L 27/20 |
| 2022/0407751 A1* | 12/2022 | Vieira | ............... | H04L 27/2601 |
| 2023/0043847 A1* | 2/2023 | Haustein | ............... | H04B 7/06966 |
| 2023/0064199 A1* | 3/2023 | Vieira | ............... | H04L 5/0023 |
| 2023/0080882 A1* | 3/2023 | Vieira | ............... | H04W 56/0045 375/267 |
| 2023/0100135 A1* | 3/2023 | Liu | ............... | H04W 24/08 370/252 |
| 2023/0208502 A1* | 6/2023 | Tidestav | ............... | H04B 7/088 375/346 |
| 2023/0209385 A1* | 6/2023 | Tidestav | ............... | H04W 16/28 370/329 |
| 2023/0216575 A1* | 7/2023 | Tidestav | ............... | H04B 7/088 375/267 |
| 2023/0361823 A1* | 11/2023 | Mo | ............... | H04B 7/06952 |
| 2023/0403063 A1* | 12/2023 | Vieira | ............... | H04B 7/06952 |
| 2024/0032047 A1* | 1/2024 | Baldemair | ............... | H04W 72/044 |
| 2024/0048422 A1* | 2/2024 | Frenne | ............... | H04L 27/262 |
| 2024/0057170 A1* | 2/2024 | Baldemair | ............... | H04W 74/0866 |
| 2024/0064815 A1* | 2/2024 | Baldemair | ............... | H04W 74/0833 |
| 2024/0073957 A1* | 2/2024 | Baldemair | ............... | H04W 74/0833 |
| 2024/0073958 A1* | 2/2024 | Baldemair | ............... | H04B 7/0695 |
| 2024/0088959 A1* | 3/2024 | Lee | ............... | H04B 7/0619 |
| 2024/0089935 A1* | 3/2024 | Baldemair | ............... | H04L 5/0053 |
| 2024/0114496 A1* | 4/2024 | Huang | ............... | H04B 7/15542 |
| 2024/0129093 A1* | 4/2024 | Baldemair | ............... | H04B 7/0695 |
| 2024/0147256 A1* | 5/2024 | Guthmann | ............... | H04B 7/06952 |
| 2024/0155408 A1* | 5/2024 | Tidestav | ............... | H04B 7/088 |
| 2024/0178970 A1* | 5/2024 | Tidestav | ............... | H04L 1/1822 |
| 2024/0187076 A1* | 6/2024 | Eriksson | ............... | H04W 16/28 |
| 2024/0195575 A1* | 6/2024 | Guthmann | ............... | H04L 1/1822 |
| 2024/0236744 A1* | 7/2024 | Baldemair | ............... | H04B 7/0695 |
| 2024/0267185 A1* | 8/2024 | Eriksson | ............... | H04L 5/0094 |
| 2024/0283595 A1* | 8/2024 | Eriksson | ............... | H04L 1/1864 |
| 2024/0284205 A1* | 8/2024 | Tidestav | ............... | H04B 7/0695 |

FOREIGN PATENT DOCUMENTS

| | | | | |
|---|---|---|---|---|
| CN | 108173578 A | | 6/2018 | |
| CN | 111093209 | * | 10/2018 | ............ H04W 16/28 |
| CN | 106559114 B | * | 8/2019 | ............... H04B 7/04 |
| CN | 111093209 A | * | 5/2020 | ............ H04B 17/391 |
| CN | 108173578 B | * | 7/2020 | ............ H04B 7/0408 |
| EP | 4021085 A1 | * | 6/2022 | ............ H04W 48/20 |
| WO | WO-2013124011 A1 | * | 8/2013 | ............ H04B 7/0617 |
| WO | WO-2019220594 A1 | * | 11/2019 | ............ H04B 7/0413 |
| WO | WO-2020094128 A1 | * | 5/2020 | ............ H04B 7/022 |
| WO | WO-2021170204 A1 | * | 9/2021 | ............... H04B 7/04 |
| WO | WO-2022178887 A1 | * | 9/2022 | ............ H04B 7/0408 |

OTHER PUBLICATIONS

V. V. Ratnam, J. Mo, A. Alammouri, B. L. Ng, J. Zhang and A. F. Molisch, "Joint Phase-Time Arrays: A Paradigm for Frequency-Dependent Analog Beamforming in 6G," in IEEE Access, vol. 10, pp. 73364-73377, 2022, doi: 10.1109/ACCESS.2022.3190418. (Year: 2022).*

Extended European Search Report issued Mar. 3, 2025 regarding Application No. 23799528.7, 9 pages (Cited in the IDS, by Applicant, filed Mar. 21, 2025.*

International Search Report and Written Opinion issued May 11, 2023 regarding International Application No. PCT/KR2023/001986, 9 pages.

Nguyen et al., "Joint Delay and Phase Precoding Under True-Time Delay constraint for THz Massive MIMO", arXiv:2111.10365v1 [cs.IT], Nov. 2021, 7 pages.

Extended European Search Report issued Mar. 3, 2025 regarding Application No. 23799528.7, 9 pages.

* cited by examiner

UPLINK COVERAGE USING JOINT PHASE-TIME ARRAYS

CROSS-REFERENCE TO RELATED AND CLAIM OF PRIORITY

The present application claims priority under 35 U.S.C. § 119(e) to U.S. Provisional Patent Application No. 63/338,638 filed on May 5, 2022, which is hereby incorporated by reference in its entirety.

TECHNICAL FIELD

The present disclosure relates generally to wireless communication systems and, more specifically, the present disclosure relates to uplink (UL) coverage enhancements with joint phase-time arrays (JPTAs).

BACKGROUND

As wireless communication has grown and the number of subscribers to wireless communication services continues to grow quickly, the demand for wireless data traffic is rapidly increasing due to the growing popularity among consumers and businesses. To meet the high growth in mobile data traffic and support new applications and deployments, improvements in radio interface efficiency and coverage are of paramount importance. Moreover, this demand for wireless data traffic has increased since the deployment of 4G communication systems, and to enable various vertical applications, 5G (e.g., fifth generation) communication systems have been developed and are currently being deployed. Several characteristics of such applications have also been considered.

A basic philosophy of 5G or New Radio (NR) in the 3rd Generation Partnership Project (3GPP) is to support beam-specific operations for wireless communication between a gNodeB (gNB) and user equipment (UE). There are several components in the 5G NR specification that can efficiently be operated in a beam-specific manner. Note that the 5G communication system involves implementation to include higher frequency millimeter-wave (mmWave) bands, such as 28 GHz or 60 GHz bands or, in general, above 6 GHz bands, to accomplish higher data rates, or in lower frequency bands, such as below 6 GHz, to enable robust coverage and mobility support.

SUMMARY

The present disclosure relates to UL coverage enhancements with JPTAs.

In one embodiment, a base station (BS) is provided. The BS includes a processor configured to identify criteria associated with a set of user equipments (UEs) in a cell of the BS and determine, based on the criteria, a first subset of the set of UEs to use a JPTA beamforming. The BS further includes a transceiver operably coupled to the processor. The transceiver is configured to use the JPTA beamforming for signaling with the first subset of UEs and use an analog beamforming for signaling with a second subset of UEs in the set of UEs.

In another embodiment, a user equipment UE is provided. The UE includes a transceiver configured to receive information regarding whether to use JPTA beamforming from a base station (BS) and a processor operably coupled to the transceiver. The processor is configured to determine, based on the information, whether to use JPTA or analog beamforming. When the information indicates to use the JPTA beamforming, the transceiver is further configured to use the JPTA beamforming for signaling with the BS. When the information indicates to use the analog beamforming, the transceiver is further configured to use the analog beamforming for the signaling with the BS.

In yet another embodiment, a method for operating a BS is provided. The method includes identifying criteria associated with a set of UEs in a cell of the BS and determining, based on the criteria, a first subset of the set of UEs to use a JPTA beamforming. The method further includes using the JPTA beamforming for signaling with the first subset of UEs and using an analog beamforming for signaling with a second subset of UEs in the set of UEs.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many, if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-17, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and non-limiting embodiments of the present disclosure may be utilized in connection with any frequency band. For example, aspects of the present disclosure may also be applied to deployment of 5G communication systems, 6G or even later releases which may use terahertz (THz) bands.

Figure 1:
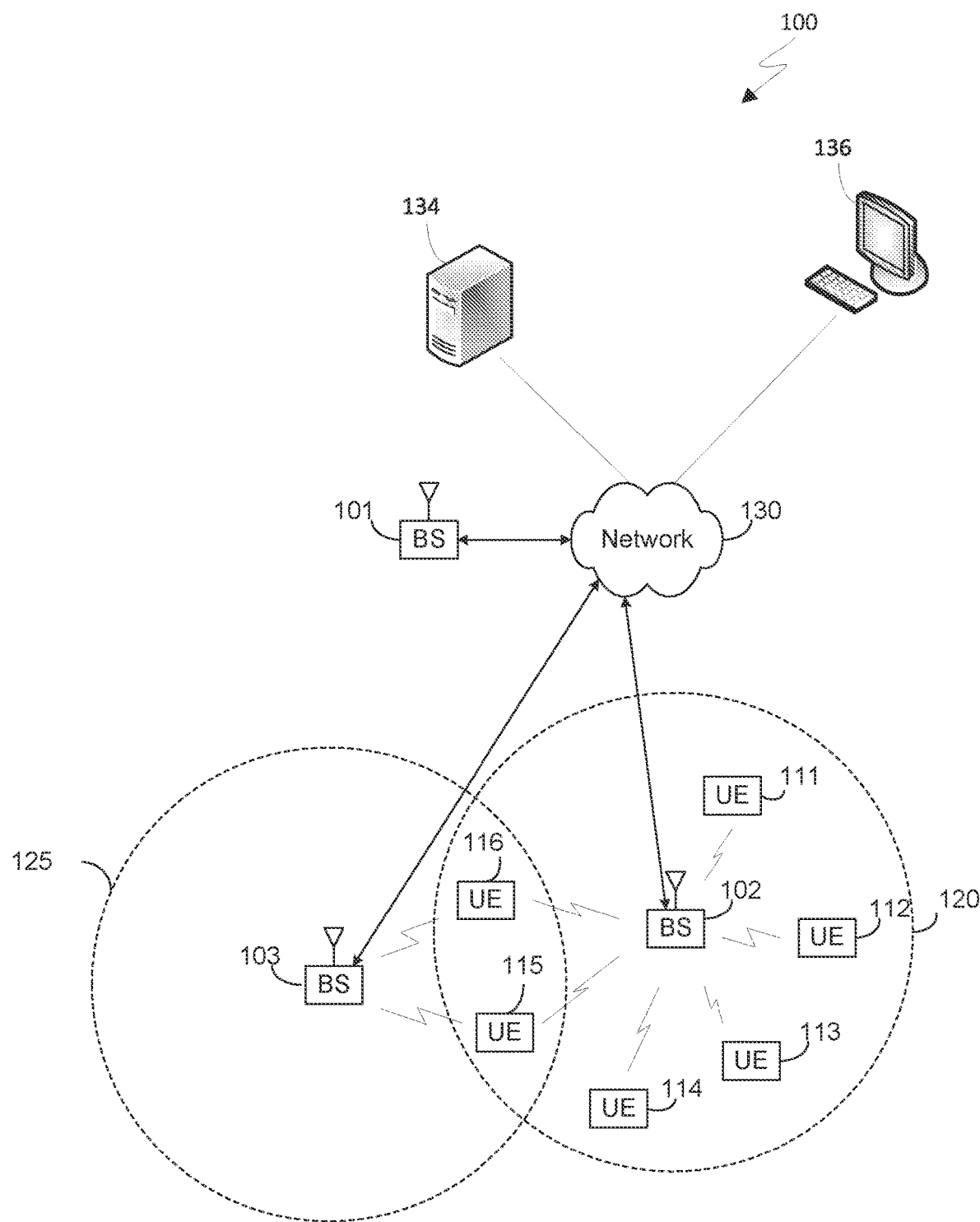
FIG. 1 illustrates an example wireless network according to various embodiments of the present disclosure.
Figure 2:
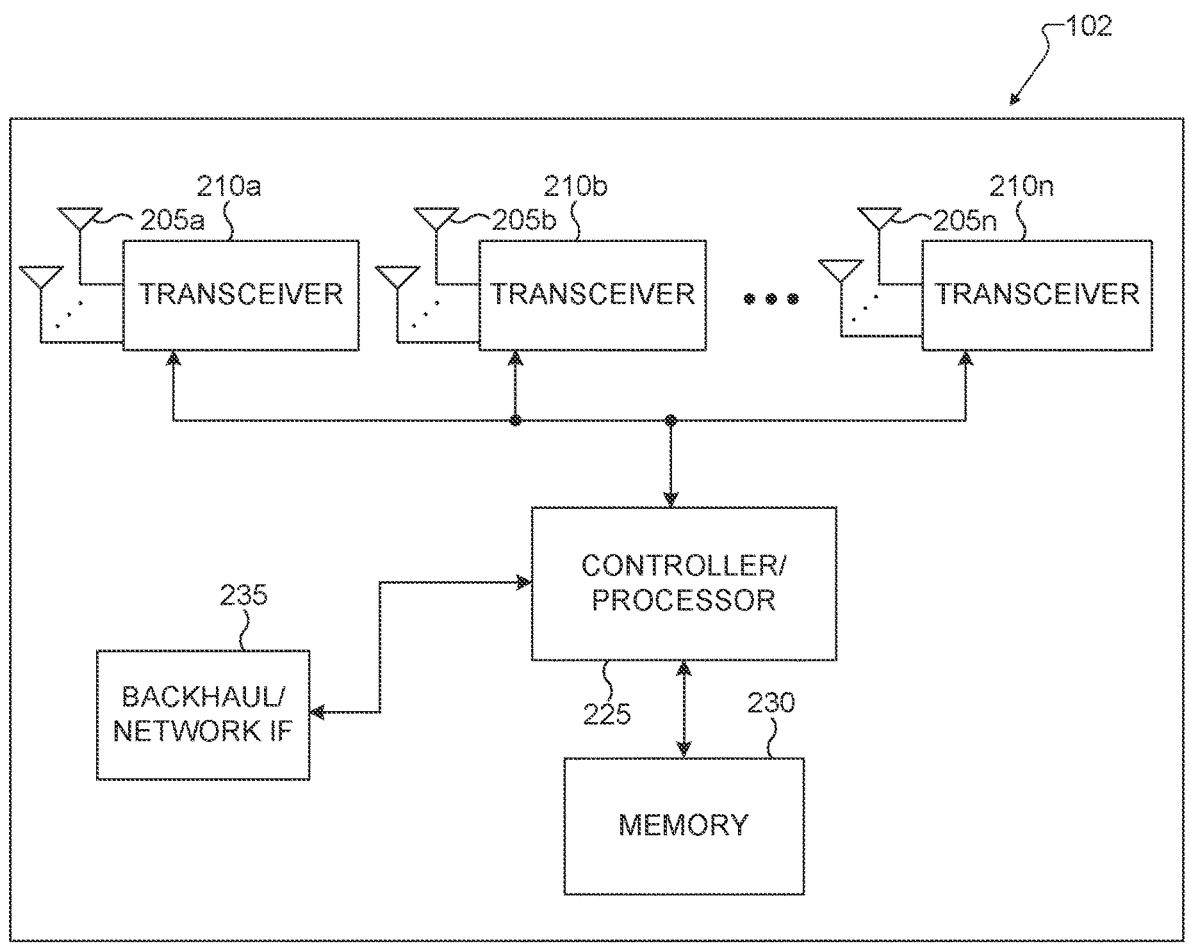
FIG. 2 illustrates an example BS according to various embodiments of the present disclosure.
Figure 3:
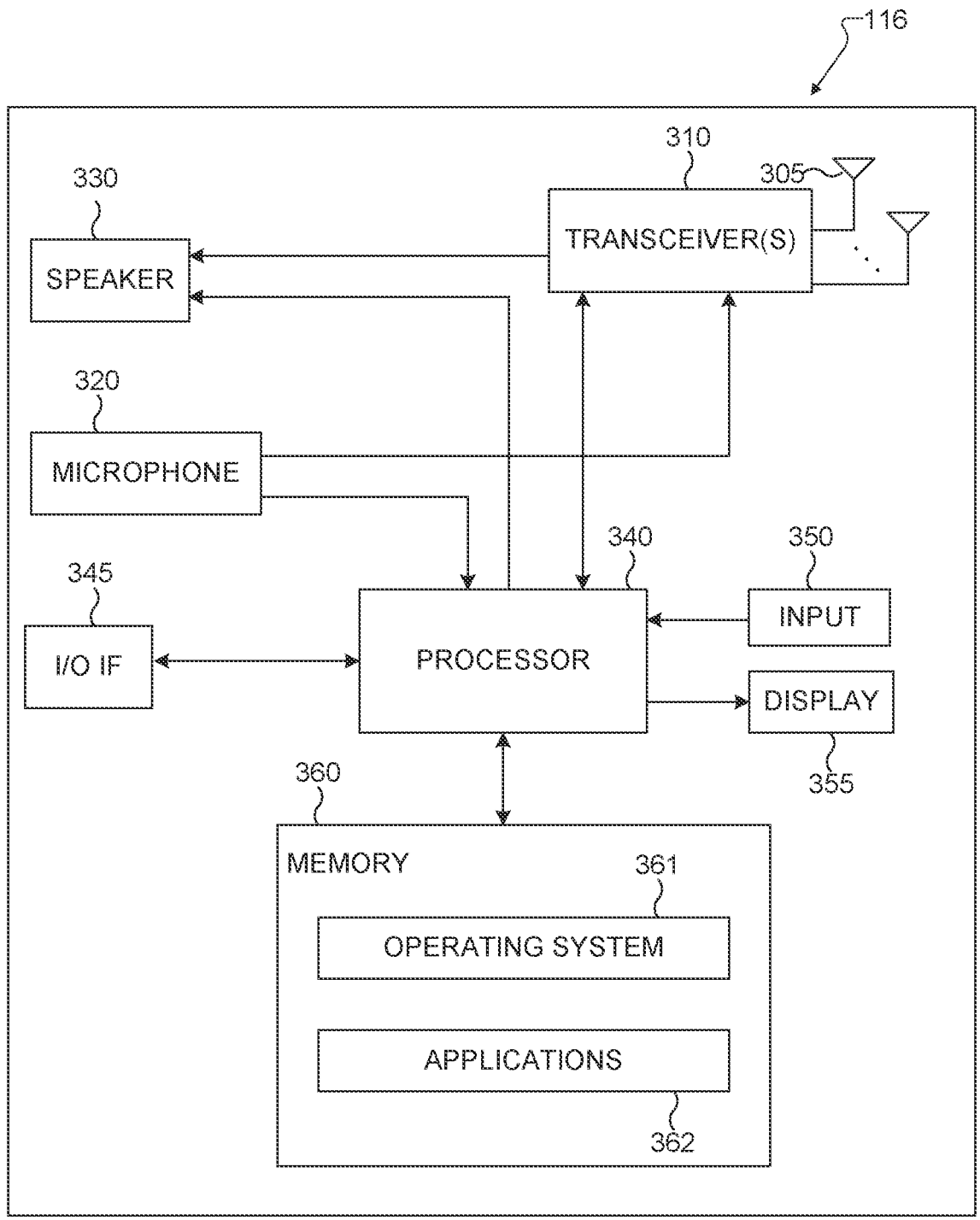
FIG. 3 illustrates an example of a UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or another data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

As described in greater detail below, in various embodiments, the eNB 102 and/or 103 provides UL coverage enhancements with JPTAs, for example, to one or more UEs 111-116, which use JPTA beamforming to enhance the UL coverage. In these embodiments, the one or more UEs 111-116, which use JPTA beamforming for UL transmissions to the eNB 102 and/or 103 for enhanced UL coverage.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

In some embodiments, the network 130 facilitates communications between at least one server 134 and various client devices, such as client device 136. Server 134 includes any suitable computing or processing device that can provide computing services for one or more client devices. Server 134 could, for example, include one or more processing devices, one or more memories storing instructions and data, and one or more network interfaces facilitating communication over the network 130.

Client device 136 represents any suitable computing or processing device that interacts with at least one server or other computing device(s) over the network 130. In this example, the client device is represented as a desktop computer, but other examples of client devices can include a mobile telephone, laptop computer, or tablet computer. However, any other or additional client devices could be used in the wireless network 100.

In this example, client devices can communicate indirectly with the network 130. For example, some client devices can communicate via one or more base stations, such as cellular base stations or eNodeBs. Also, client devices can communicate via one or more wireless access points (not shown), such as IEEE 802.11 wireless access points. Note that these are for illustration only and that each client device could communicate directly with the network 130 or indirectly with the network 130 via any suitable intermediate device(s) or network(s).

As described in more detail below, a computing device, such as server 134 or client device 136, may determine and/or generate parameters for when and for what UEs with which to use JPTA beamforming for UL coverage enhancement. For example, the server 134 or client device 136 may perform cell planning based on field measurement and/or simulation and generate and disseminate thresholds or criteria for when and for what UEs with which to use JPTA beamforming for UL coverage enhancement in the network 100.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. As described in greater detail below, in various embodiments, the eNB 102 provides UL coverage enhancements with JPTAs, for example, to one or more UEs 111-116, which use JPTA beamforming to enhance the UL coverage.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG/ 3 does not limit the scope of this disclosure to any particular implementation of a UE.

As shown in FIG/ 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna(s) 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. For example, in various embodiments, the UE 116 uses JPTA beamforming for UL transmissions to the eNB 102 and/or 103 for enhanced UL coverage.

In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
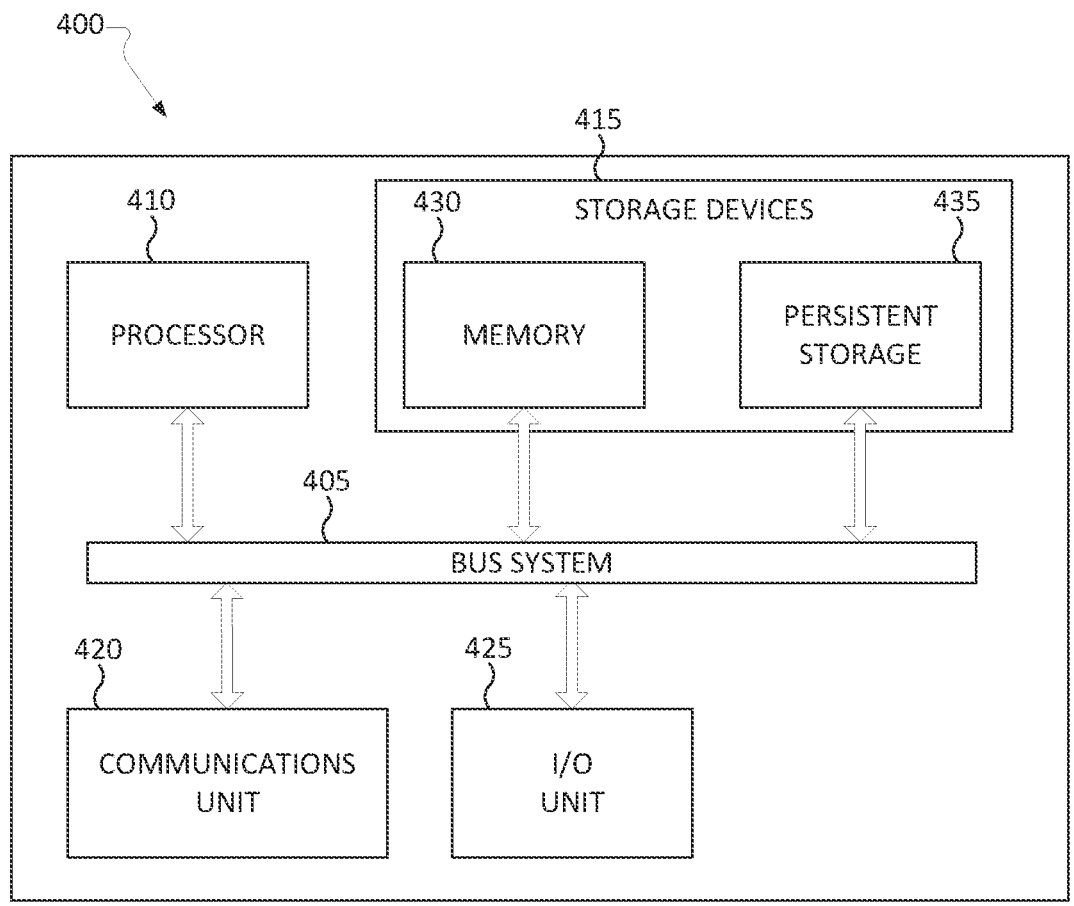
FIG. 4 illustrates a diagram of a computing device according to various embodiments of the present disclosure.

FIG. 4 illustrates an example of a computing device 400 in accordance with various embodiments of this disclosure. In one embodiment, the computing device 400 is a server, such as server 134 in FIG. 1 or a client device, such as client device 136 in FIG. 1. The computing device 400 is for illustration only and other embodiments can be used without departing from the scope of the present disclosure.

As shown in FIG. 4, the computing device 400 includes a bus system 405, which supports communication between at least one processor 410, at least one storage device 415, at least one communications unit 420, and at least one input/output (I/O) unit 425. The processor 410 executes instructions that may be loaded into a memory 430. The processor 410 may include any suitable number(s) and type(s) of processors or other devices in any suitable arrangement. Examples of types of processor 410 include microprocessors, microcontrollers, digital signal processors, field programmable gate arrays, application specific integrated circuits, and discreet circuitry.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random-access memory or any other suitable volatile or non-volatile storage device(s). The persistent storage 435 may contain one or more components or devices supporting longer-term storage of data, such as a ready only memory, hard drive, flash memory, or optical disc.

The communications unit 420 supports communications with other systems or devices. For example, the communications unit 420 could include a network interface card or a wireless transceiver facilitating communications over the network 130. The communications unit 420 may support communications through any suitable physical or wireless communication link(s).

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

In various embodiments, the computing device 400 may determine and/or generate parameters for when and for what UEs with which to use JPTA beamforming for UL coverage enhancement. For example, the server 134 or client device 136 may perform cell planning based on field measurement and/or simulation and generate and disseminate thresholds or criteria for when and for what UEs with which to use JPTA beamforming for UL coverage enhancement.

Note that while FIG. 4 is described as representing the server 134 of FIG. 1, the same or similar structure could be used in one or more client devices. For example, client device 136 can have the same or similar structure as shown in FIG. 4.

Figure 5:
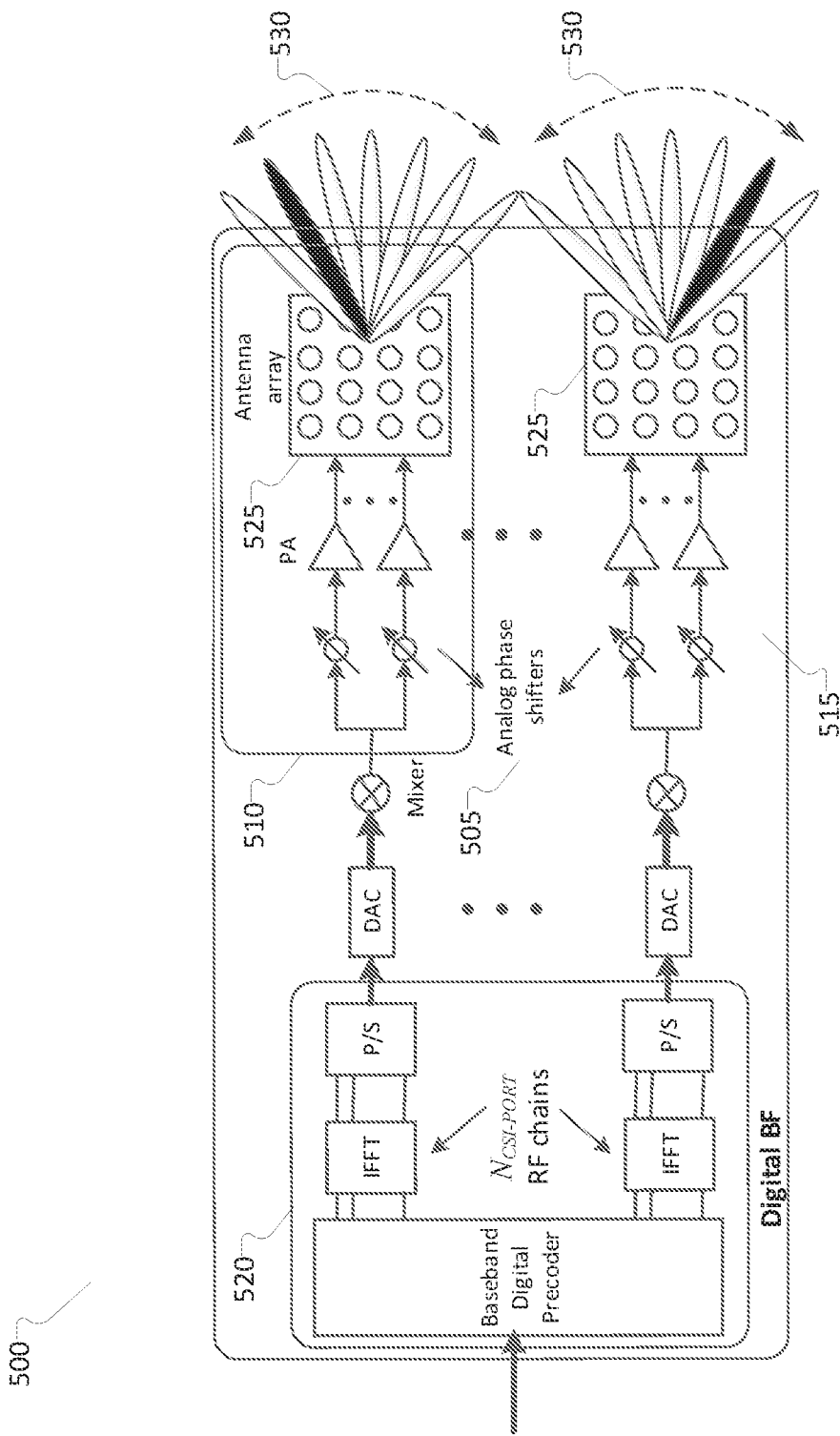
FIG. 5 illustrates an example of a transmitter structure for beamforming according to various embodiments of the present disclosure.

FIG. 5 illustrates an example of a transmitter structure 500 for beamforming according to various embodiments of the present disclosure. The non-limiting embodiment of the transmitter structure 500 illustrated in FIG. 5 is for illustration only. FIG. 5 does not limit the scope of this disclosure to any particular implementation of the transmitter structure 500. In certain embodiments, one or more of gNB 102 or UE 116 include the transmitter structure 500. For example, one or more of antenna 205 and its associated systems or antenna 305 and its associated systems can be included in transmitter structure 500.

In the example shown in FIG. 5, the transmitter structure 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes.

As operating frequency bands in NR become higher, the UE may include a plurality of antenna arrays 525 or panels (each panel is able to transmit via one analog beam, e.g., analog BF 510) to enhance aspects of multi-beam operation such as coverage enhancement, beam failure event minimization, fast beam switching, and the like. In various embodiments, the antenna arrays 525 perform JPTA beamforming to enhance UL coverage.

Embodiments of the present disclosure recognize and take into consideration that analog-beamforming or hybrid beamforming relies on analog hardware such as phase-shifters and switches to create the beam shapes. However, these analog hardware components create a frequency-flat response, i.e., all components of the input signal frequency undergo a similar transformation after passing through them. This reduces the flexibility of the beamforming that is possible in such analog or hybrid beamforming systems, in comparison to fully-digital architectures where each antenna array is fed with a dedicated RF chain.

Embodiments of the present disclosure further recognize and take into consideration that a critical issue in 5G deployment is limited coverage. Because of the high path loss, high penetration loss and blockage at the mmWave band, the cell radius of the mmWave 5G is much less than the sub-6 GHz mid-band 5G and low-band LTE. The cost of installing a mmWave cellular network is thus much higher than the sub-6 GHz mid-band GHz 5G and low-band LTE. Currently, the mmWave 5G is mostly only available in downtown areas, stadiums, airports, etc. With sub-THz or THz communications being proposed for 6G, embodiments of the present disclosure recognize and take into consideration that this coverage issue may become more severe. Various embodiments of the present disclosure also recognize that due to lower transmission power at the UE than at BS, the UL coverage is more likely to be a bottleneck of cell coverage.

Various embodiments of the present disclosure recognize that progress has been made in the implementation of a new type of analog hardware called true-time delay (TTD). Unlike switches and phase-shifters TTDs have a frequency-dependent behavior, i.e., different components of the input signal frequency undergo different transformations after passing through them. Thus, using hybrid transceiver architectures where a few number of RF chains are connected to a large antenna array using TTDs, frequency-dependent beamforming can be achieved that is more versatile than the frequency-flat beamforming methods. Herein, the frequency-dependent beamforming method is referred to as JPTA beamforming.

Accordingly, various embodiments of the present disclosure provide for JPTA beamforming techniques to extend UL coverage and enhance throughput for the cell-center user. For example, the present disclosure provides standard compliant operation schemes of JPTA, covering resource allocation schemes and control signaling. Various embodiments provide for utilizing analog beamforming on a first beam set serving one or more UEs and JPTA beamforming on a second beam set. In these embodiments, first beam set may be for UEs likely to be at a cell center where UL coverage is less likely to be an issue due to proximity to the BS. The second beam set can be for UEs likely to be at a cell edge. Various embodiments of the present disclosure provide for utilizing a joint phase-time operation in UL to enhance UL coverage for one or more UE devices.

For certain carrier frequencies such as mmWave bands or higher bands, the gNB typically has multiple beams to provide signal coverage within the cell to the UEs. Each of the gNB's beams provides a local coverage that is not overlapping or is partially overlapping in its spatial coverage with another beam. In various embodiments, the gNB can use a set of beams (beam set 1) that are used to serve UEs that do not need enhanced UL coverage. For example, these may be UEs with a higher (e.g., lower than a threshold) signal quality (or strength) for UL signals received by the gNB. While the gNB may not know the precise location of the UEs, these UE's may be considered to associated with a center of the cell (e.g., be away from the cell edge and closer to the cell center) and, as such, may be able to transmit UL signals that can be received by the gNB with sufficient quality so as to not need enhanced UL coverage via JPTA beamforming. On the other hand, the gNB can use a second set of beams (beam set 2) that are used to serve UEs with enhanced UL coverage. For example, these may be UEs with a lower (e.g., lower than a threshold) signal quality for UL signals received by the gNB. While the gNB may not know the precise location of the UEs, these UE's may be considered to associated with an edge of the cell (e.g., be away the cell center and near the cell edge) and, as such, may not be able to transmit UL signals that can be received by the gNB with sufficient quality so as to benefit from enhanced UL coverage via JPTA beamforming. Whether a beam should be included in beam set 1 or beam set 2 can be characterized by whether the signals received on the beam, which is transmitted by the UEs within the beam coverage, has sufficiently high signal strength or signal quality. If the signals received on the beam are typically (or on average) sufficiently high, such that a high data rate can be supported on the beam, then it should be in beam set 1, otherwise, it should be in beam set 2.

Figure 6:
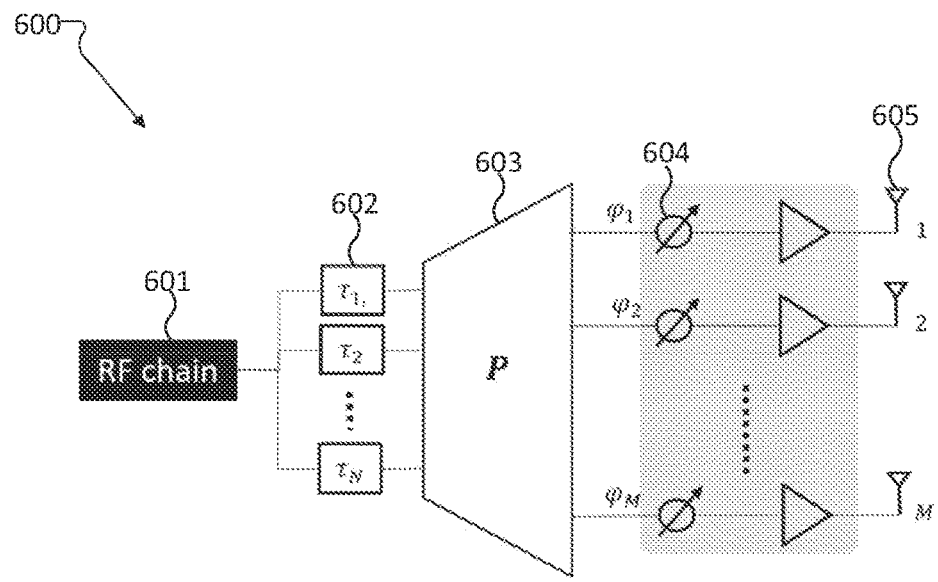
FIG. 6 illustrates an example of a BS JPTA architecture with one radio frequency (RF) chain and single phase-shifter per antenna element according to various embodiments of the present disclosure.

FIG. 6 illustrates an example of a BS JPTA architecture 600 with one RF chain and single phase-shifter per antenna element according to various embodiments of the present disclosure. For example, the BS JPTA architecture 600 may be implemented in a BS such as gNB 102 and, more particularly, in one or more of the transceivers 210. The BS JPTA architecture 600 is for illustration only and other embodiments can be used without departing from the scope of the present disclosure.

In one embodiment, the BS is assumed to have a uniform linear antenna array having M elements, and $N_{RF}=1$ RF chain. Note that the disclosure can be directly extended to planar array configurations. The antenna spacing is half-wavelength at the center frequency $f_0$. Each of the M antennas has a dedicated phase-shifter, and they are connected to the single RF chain via a network of $N \leq M$ TTDs as shown in FIG. 6. Here P is a fixed M×N mapping matrix, where each row m has one non-zero entry and determines which of the N TTDs antenna m is connected to. The TTDs are assumed to be configurable, with a delay variation range of $0 \leq \tau \leq \kappa W$, where $\kappa$ is a design parameter to be selected. The phase-shifters are assumed to have unit magnitude and have arbitrarily reconfigurable phase $-\pi \leq \phi < \pi$. Transmission in both uplink and downlink directions is performed using OFDM with K subcarriers indexed as $$\mathcal{K} = \left\{ \left\lceil \frac{1-K}{2} \right\rceil, \ldots, \left\lfloor \frac{K-1}{2} \right\rfloor \right\}.$$

Then, the M×1 downlink TX signal on sub-carrier $k \in \mathcal{K}$ for a representative OFDM symbol can be expressed as $$x_k = \frac{1}{\sqrt{M}} \begin{bmatrix} e^{j\phi_1} & \cdots & 0 \\ \vdots & \ddots & \vdots \\ 0 & \cdots & e^{j\phi_M} \end{bmatrix} P \begin{bmatrix} e^{j2\pi f_k \tau_1} \\ \vdots \\ e^{j2\pi f_k \tau_N} \end{bmatrix} \alpha_k s_k = TPd_k \alpha_k s_k$$

where $s_k$ and $\alpha_k$ are the scalar data and digital beamforming on the k-th subcarrier, $f_k$ is the frequency of the k-th sub-carrier (including the carrier frequency), $\tau_n$ is the delay of the n-th TTD and $\phi_m$ is the phase of the m phase-shifter connected to the m-th antenna. Note that from the equation above the total transmit power of the BS can be given by $P_{sum} = \Sigma_{k \in \mathcal{K}} |\alpha_k|^2$. Note that for this JPTA architecture, the effective downlink unit-norm analog beamformer on sub-carrier k is $e_k = TPd_k$, where the M×M diagonal matrix T captures the effect of phase-shifters and the N×1 vector $d_k$ captures the effect of TTDs. It can be shown that the same beamformer is also applicable at the BS for uplink scenario.

Figure 7:
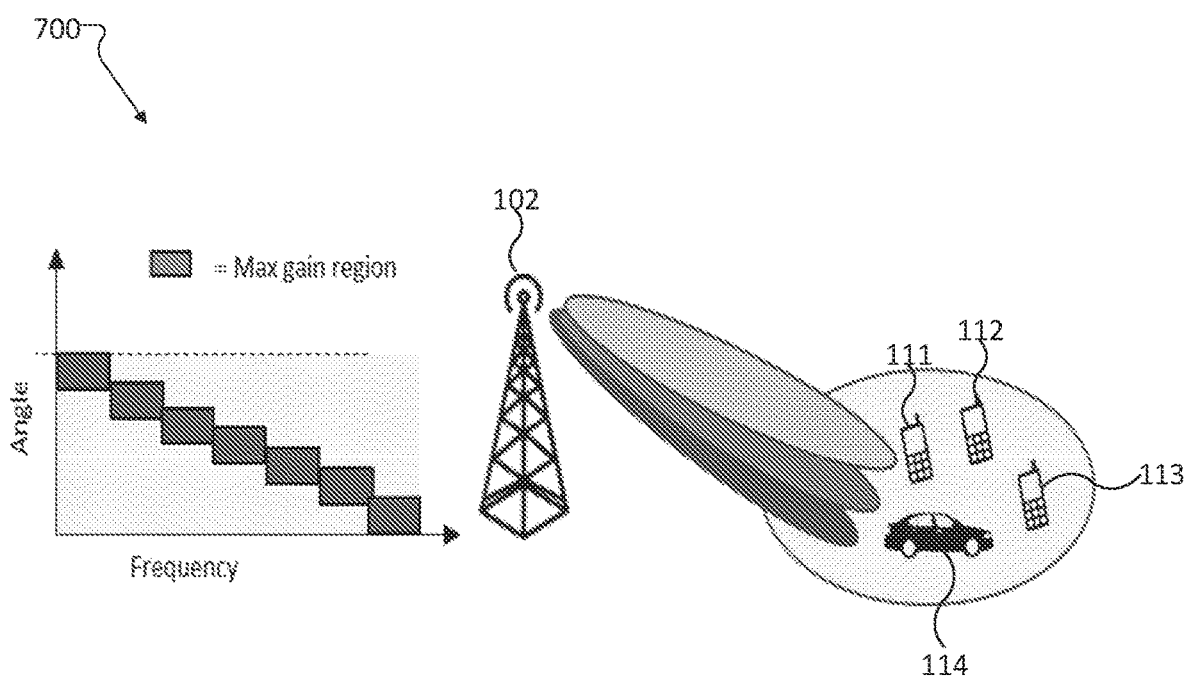
FIG. 7 illustrates an example of a JPTA beamforming according to various embodiments of the present disclosure.

FIG. 7 illustrates an example of a JPTA beamforming 700 according to various embodiments of the present disclosure. For example, the JPTA beamforming 700 provides an example of the frequency varying linearly over the system bandwidth and the angular direction sweeping linearly over a certain region according to embodiments of the present disclosure. For example, the JPTA beamforming 700 may be performed in network 100 by BS 102. The JPTA beamforming is for illustration only and other embodiments can be used without departing from the scope of the present disclosure.

In one example behavior of JPTA operation, the maximum gain region of the beam sweeps over an angle range as the signal frequency varies. At any signal frequency f, the desired beam creates the maximum possible array-gain in one angular direction $\theta(f)$. As f varies linearly over the system bandwidth, the angular direction $\theta(f)$ also sweeps linearly over a certain angular region $[\theta_0-\Delta\theta/2, \theta_0+\Delta\theta/2]$, as shown in FIG. 7. Embodiments in this disclosure can be applied to other behaviors of JPTA operation as well. The example illustrated in FIG. 7 are for illustration only and other embodiments can be used without departing from the scope of the present disclosure.

In an analog gNB beamforming scheme, the gNB switches the beam to transmit or receive from the UEs over time, such that only one beam is used at any given time. For example, the gNB performs analog beamforming and sweeps the analog beams over time, in order to communicate with its UEs.

The eNB can also use a JPTA operation in the UL for the purpose of enhancing the UL coverage for the UEs. Specifically, the gNB can employ a JPTA beamforming to receive UL channels/signals transmitted by the UEs (e.g., corresponding to UL reception on beam set 2). The UEs may still employ the analog beamforming in their UL transmissions.

Figure 8:
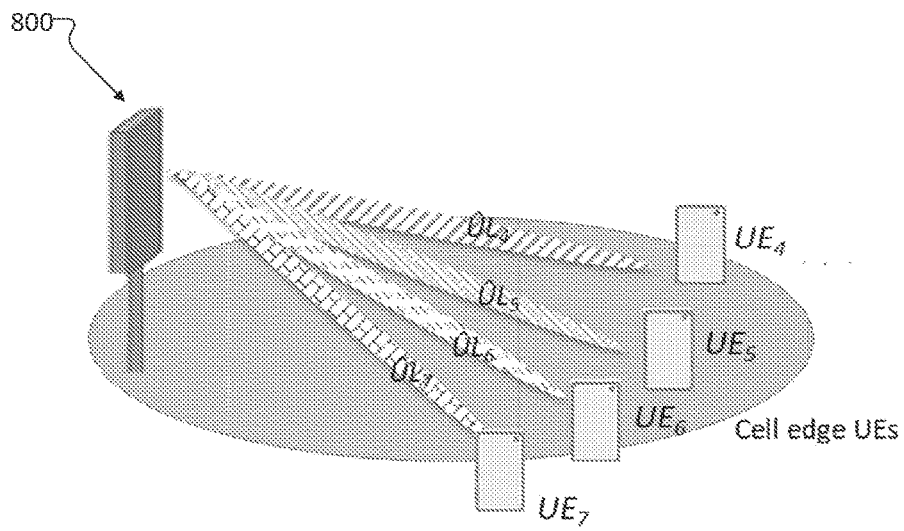
FIG. 8 illustrates an example of a JPTA beamforming on a beam set according to various embodiments of the present disclosure.
Figure 9:
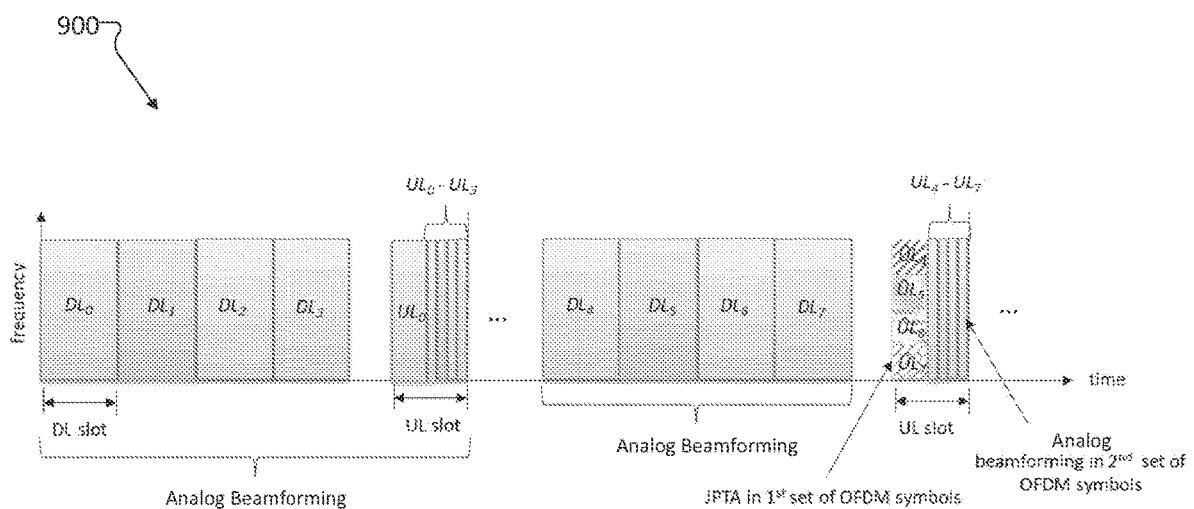
FIG. 9 illustrates an example resource diagram for JPTA beamforming for a different set of UL orthogonal frequency division multiplexing (OFDM) symbols according to various embodiments of the present disclosure.

FIG. 8 illustrates an example of a JPTA beamforming 800 on a beam set according to various embodiments of the present disclosure and FIG. 9 illustrates an example resource diagram 900 for JPTA beamforming for a different set of UL OFDM symbols according to various embodiments of the present disclosure. For example, the JPTA beamforming 800 may be performed by the BS 102 in the network 101 and the resource diagram 900 may be used by the BS 102 for analog beamforming and JPTA beamforming for different UE's UL sets according to embodiments of the present disclosure. The JPTA beamforming 800 and the resource diagram 900 are for illustration only and other embodiments can be used without departing from the scope of the present disclosure.

In FIG. 8, data on the UL slots are received using analog beams $UL_0$ to $UL_3$. Note that this is just an illustrative example, the network 101 may have 10s or 100s of beams. For the JPTA operation, UEs located at the cell edge have a greater chance of UL transmission in the time domain. The UE can thus transmit multiple replicas of the physical uplink control channel (PUCCH) and/or physical uplink shared channel (PUSCH) packets, which boosts the effective signal to interference and noise ratio (SINR) and thus facilitates the decoding at the BS. The total time-frequency radio resource assigned to cell edge UE can be the same between analog and JPTA beamforming. However, the UE in the JPTA operation can deliver more energy to the BS because of a longer uplink transmission duration. The result of JPTA beamforming being applied to the UEs enable the UL signals to be received simultaneously in a single UL slot.

Embodiments of the present disclosure recognize that not all UL channels/signals may require coverage enhancement via JPTA operation. Therefore, in various embodiments, the gNB applies JPTA to a subset of UL channels/signals transmitted by the UEs experiencing cell edge condition. JPTA beamforming ($UL_4$ to $UL_7$) is applied to a first set of OFDM symbols in the UL slot, whereas the analog beamforming ($UL_4$ to $UL_7$) is applied to the second set of OFDM symbols in the same UL slot. In one example, the first set of OFDM symbols can be the PUSCHs for $UE_4, \ldots, UE_7$, and the second set of OFDM symbols can be the PUCCHs/SRSs for $UE_4, \ldots, UE_7$. This can be implemented by the gNB for the purpose of enhancing the UL coverage for PUSCHs of the cell edge UEs.

Figure 10:
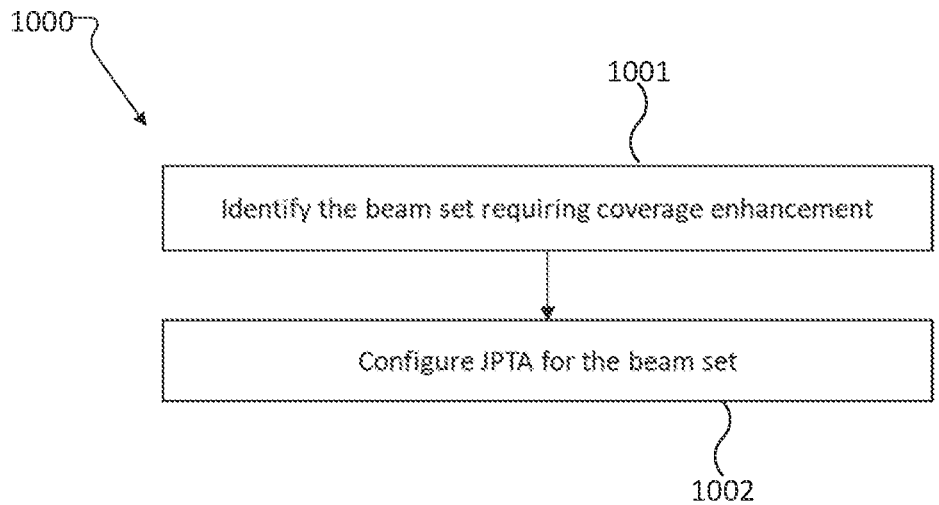
FIG. 10 illustrates a flowchart of an example process for JPTA operation according to various embodiments of the present disclosure.

FIG. 10 illustrates a flowchart of an example process 1000 for JPTA operation according to various embodiments of the present disclosure. For example, the process 1000 may be implemented by the BS 102 or the computing device 400. The process 1000 for JPTA operation is for illustration only and other embodiments can be used without departing from the scope of the present disclosure.

In various embodiments, in order to enable UL coverage enhancement via JPTA, the BS 102 uses process 1000 to identify beam set 2, configure JPTA operation for the beam set, and configure the relevant UL physical channels and signals. In other embodiments, the process 1000 in FIG. 10 can be performed at a cell planning stage based on field measurement and/or simulation, for example, by computing device 400.

The method begins in step 1001, where a beam requiring coverage enhancement is identified by determining if a UL SNR for the beam is less than a threshold, which can be determined by a link budget analysis. For example, the threshold can be the minimum required UL SNR needed to support a certain data rate at the target maximum distance of the cell. In another embodiment of this first step, a beam requiring coverage enhancement can be identified by checking if the uplink block error rate (BLER) at a minimum MCS level is above a threshold, for example, 10%.

JPTA is configured for the beam set to extend the coverage in step 1002. For example, the true time delay (TTD) elements in JPTA are tuned to expand the JPTA angular dispersion. The angular dispersion could be decided according to the target coverage/link budget and/or the TTD element cost. If there is only one JPTA beam to serve all the cell-edge UEs, the coverage extension is maximized. Each UE can access a small fraction of bandwidth, but can do the maximum number of retransmissions in the time domain. When there are multiple JPTA beams, the coverage extension is less. However, the requirement of the TTD elements (for example, the maximum delay range) is also lower. The choice could depend on the trade-off between the TTD element cost and the cell coverage extension benefits.

In other embodiments, the process 1000 in FIG. 10 can be performed at a cell planning stage based on field measurement and/or simulation, for example, by computing device 400. The computing device 400, after performing the process 100, can identify the appropriate gNB beam for the UE and update the gNB, for example, due to an environment change or as part of a UE mobility via beam management procedure involving beam measurement and reporting by the UE.

Figure 11:
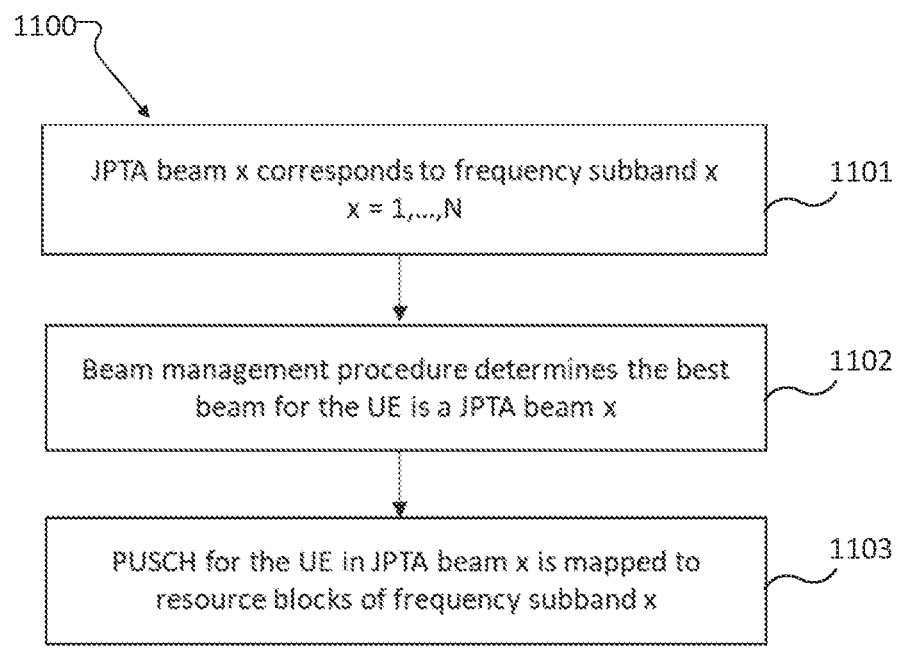
FIG. 11 illustrates a flowchart of an example process for resource assignment for a physical uplink shared channel (PUSCH) for a UE using a JPTA beam according to various embodiments of the present disclosure.

FIG. 11 illustrates a flowchart of an example process 1100 for resource assignment for a PUSCH for a UE using a JPTA beam according to various embodiments of the present disclosure. For example, the process 1100 may be implemented by the BS 102. The process 1100 is for illustration only and other embodiments can be used without departing from the scope of the present disclosure.

The process begins in step 1101, the BS 102 identifies that a JPTA beam corresponds to a frequency subband resource. Examples of UL subband resources that the JPTA beam can correspond to are PUSCH, PUCCH, SRS, etc.

In step 1102, the BS 102 identifies that a beam management procedure for determining the best beam for the UE (e.g., process 1000) is a JPTA beam. The appropriate gNB beam for the UE can be determined and updated due to environment change or a UE mobility via beam management procedure involving beam measurement and reporting by the UE. The BS 102 then maps the PUSCH for the UE for the JPTA beam to resource blocks of the frequency subband in step 1103.

In these examples, the BS 102 determines the frequency resources for UL transmission (in this case, PUSCH) for the UE when the beam management procedure determines that the best beam for the UE is a JPTA beam. In other embodiments, the UEs and hence the corresponding gNB beams that can benefit from UL coverage enhancement may not be limited to the beams at the edge of the cell. Enhancement may also be beneficial for UEs away from the cell edge (e.g., close to the cell center), particularly when there is a blockage condition, or a non-light-of-sight (NLOS) condition. In addition, the need for coverage enhancement due to this condition may be temporary or long term depending on the cause of the blockage/NLOS. For example, if the blockage is caused by a building, the condition can be permanent. In another example if the blockage is caused by a vehicle or a local condition such as the terminal is in a pocket, then it can be temporary. It is beneficial to have a procedure to identify beam set 2 in a more dynamic manner during the network operation and apply JPTA beamforming to the identified beam set 2. In other words, the beam set 2 can be updated during network operation.

Figure 12:
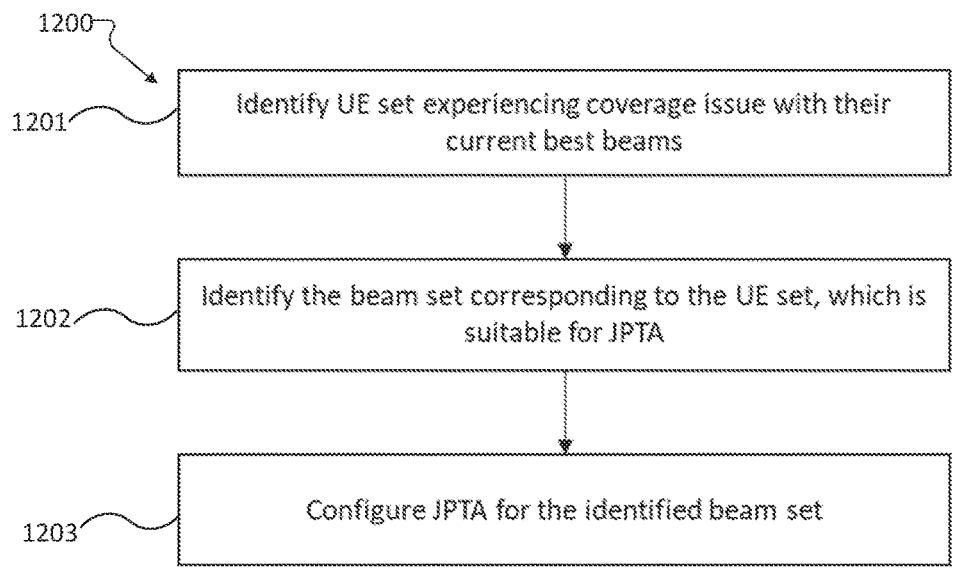
FIG. 12 illustrates a flowchart of an example process for JPTA operation according to various embodiments of the present disclosure.

FIG. 12 illustrates a flowchart of an example process 1200 for JPTA operation according to various embodiments of the present disclosure. For example, the process 1200 may be implemented by the BS 102. The process 1200 is for illustration only and other embodiments can be used without departing from the scope of the present disclosure.

Embodiments of the present disclosure provide multiple methods of JPTA operation. The flowchart of FIG. 12 illustrates another example process 1200 for JPTA operation to enable a dynamic update of beam 2. The JPTA operation is for illustration only and other embodiments can be used without departing from the scope of the present disclosure.

The method begins in step 1201, with the BS 102 determining the set of UEs which can benefit from JPTA. This involves identification of UE set which is experiencing signal coverage issue with their current best beams. One or more criteria can be used for such purpose. An example criteria is the UE's UL reference signal received power (RSRP)/SNR/SINR/(measured at the gNB) is less than a first threshold. The measurement can be averaged over an appropriate time window. An additional example criteria is the UE's BLER for a certain physical channel of a certain MCS (e.g., PUSCH with MCS 0 (lowest code rate)) is greater than a second threshold. A further example criteria is the UE's report of DL SNR/SINR/RSRP is less than a third threshold. The measurement can be averaged over an appropriate time window. Due to channel reciprocity, the DL measurement result can be used to infer the quality of UL signal reception.

In step 1202, the BS 102 identifies the beam set corresponding to the UE set that is suitable for JPTA. This can be the same as the best beams for those UEs or can be selected from the best beams for those UEs based on a certain criterion. In one example, there can be a maximum set size for the beam set 2, which can be beneficial for JPTA implementation simplicity. Therefore, the beam set determined from step 1201 is further down selected to fit the predetermined maximum set size. The selection criterion can be based on maximization of the number of UEs to benefit from the JPTA operation. Other selection criterion is also possible.

At block 1203, the BS 102 configures JPTA for the identified beam set. Performing this step includes applying JPTA to the identified beam set from step 1202.

Figure 13:
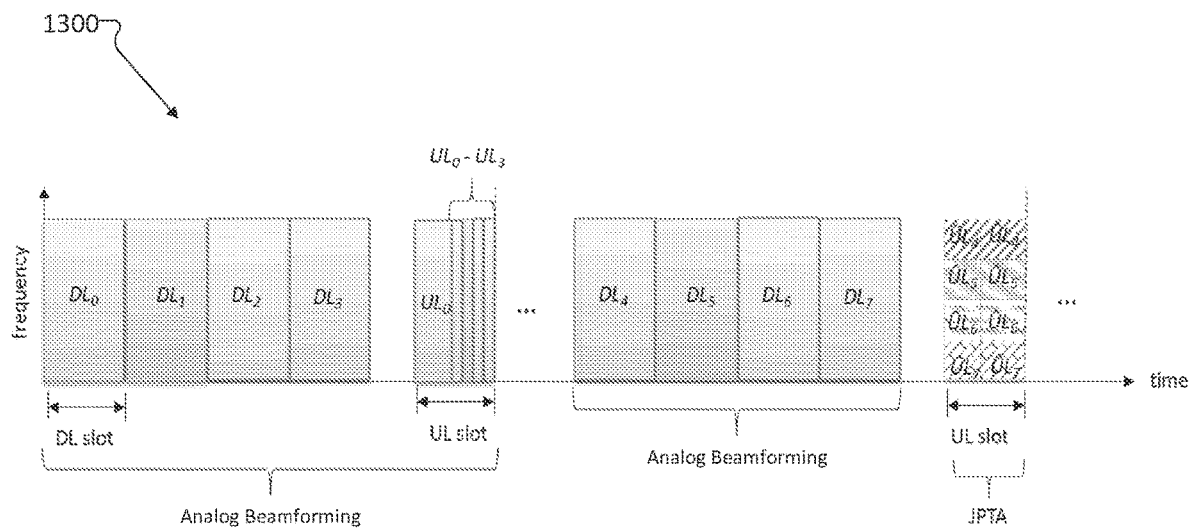
FIG. 13 illustrates an example resource diagram for JPTA beamforming on UL OFDM symbols according to various embodiments of the present disclosure.

FIG. 13 illustrates an example resource diagram 1300 for JPTA beamforming on UL OFDM symbols according to various embodiments of the present disclosure. The resource diagram 1300 may be used by the BS 102 for analog beamforming and JPTA beamforming for different UE's UL sets according to embodiments of the present disclosure. In these examples, JPTA beamforming ($UL_4$ to $UL_7$) is applied to all the OFDM symbols in an UL slot which can include PUSCH, PUCCH, and SRS according to various embodiments of the present disclosure. This example is for illustration only and other embodiments can be used without departing from the scope of the present disclosure.

In certain wireless communication standards such as the 3GPP 5G NR standard, the frequency resource for some UL physical channels and/or signals for a UE can be configured by the gNB in a semi-static manner. For example, the PUCCH frequency resources and SRS frequency resources are configured by the gNB via higher layer signaling such as the radio resource control (RRC) signaling.

In one embodiment, when the best JPTA beam for the UE is updated based on a beam management procedure, RRC reconfiguration can be performed by the gNB to update the frequency resources for the PUCCH, the SRS, and other relevant UL channels and signals.

Figure 14:
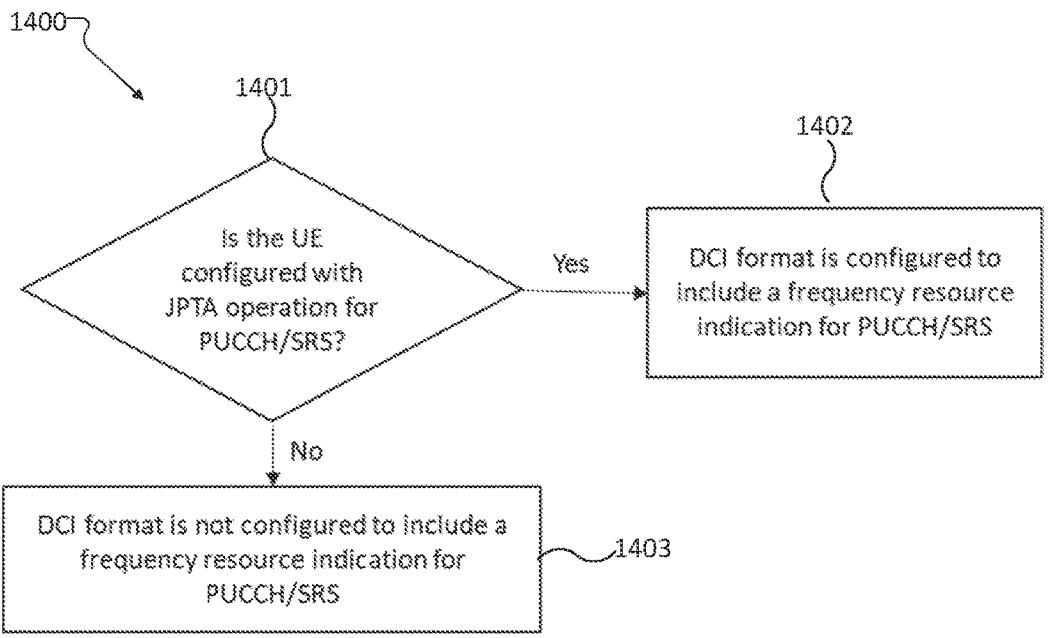
FIG. 14 illustrates a flowchart of an example process for a frequency resource indication in downlink (DL) control information (DCI) formats for physical uplink control channel (PUCCH)/sounding reference signal (SRS) transmissions according to various embodiments of the present disclosure.

FIG. 14 illustrates a flowchart of an example process 1400 for a frequency resource indication in DCI formats for PUCCH/SRS transmissions according to various embodiments of the present disclosure. For example, the process 1400 may be implemented by the BS 102. The process 1400 is for illustration only and other embodiments can be used without departing from the scope of the present disclosure.

Embodiments of the present disclosure provide multiple methods for frequency resource indication in DL DCI formats. In one embodiment, if the UE is configured with the JPTA operation, the BS 102 indicates the frequency resources for PUSCH in DCI formats for scheduling PUSCH. In order to enable lower latency or lower overhead frequency resources update (than higher layer signaling update) for PUCCH and/or SRS for a UE, an indication of the frequency resource according to the JPTA operation can be included in the relevant DCI formats. For example, the BS 102 determines whether the UE is configured with JPTA operation for PUCCH/SRS in step 1401. If so, the BS 102 includes an indication of a frequency resource for the PUCCH/SRS in the DCI format and sends the DCI format to the UE in step 1402. If not, the BS 102 does not include an indication of a frequency resource for the PUCCH/SRS in the DCI format in step 1403.

For 5G NR PUCCH, the relevant DCI formats to be modified for this purpose can be DCI format 1_0 and DCI format 1_1, which can either be realized with enhanced PUCCH resource indicator, or by including a new field to include the assigned PUCCH frequency resource. The PUCCH formats to be supported with JPTA can be PUCCH format 1, 3 and 4, which are designed to support good coverage. Other PUCCH formats with time repetition to enhance coverage are not precluded.

For 5G NR SRS, the relevant DCI formats to be modified for this purpose can be DCI format 0_1, which can either be realized with enhanced SRS resource indicator, or by including a new field to include the assigned SRS frequency resource. When the DCI format indicates the frequency resource, the UE also assumes that the SRS transmission is repeated over multiple time resources to enhance the received SNR at the gNB.

In another embodiment, when the UE is configured to operate in JPTA, the frequency resource assigned for PUCCH and/or SRS is implicitly determined from the frequency resource assigned for PUSCH in the corresponding DCI format. This is due to the assumption that the same JPTA beam is used for PUSCH, PUCCH and SRS. In one method, the physical resource blocks (PRB) assigned by the gNB for PUSCH (e.g., the starting PRB) can be mapped to a PRB frequency offset for PUCCH resource and/or SRS resource.

Figure 15:
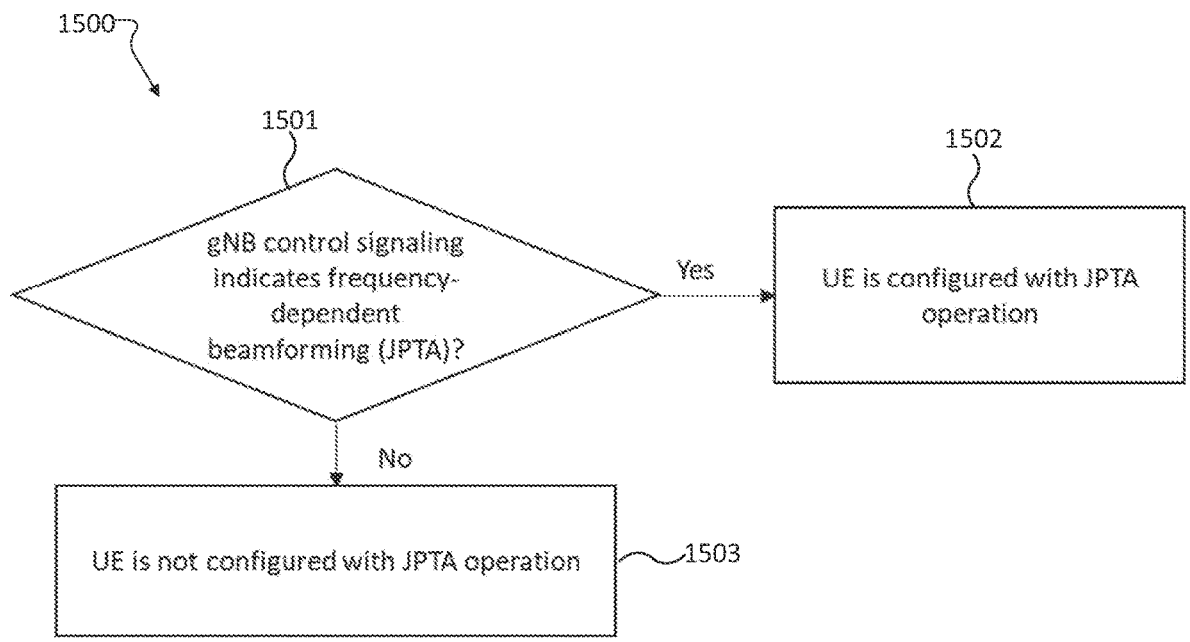
FIG. 15 illustrates a flowchart of an example process for control signaling to indicate operation in JPTA for the UE according to various embodiments of the present disclosure.

FIG. 15 illustrates a flowchart of an example process for control signaling to indicate operation in JPTA for the UE according to various embodiments of the present disclosure. For example, the process 1500 may be implemented by the UE 116. The process 1500 is for illustration only and other embodiments can be used without departing from the scope of the present disclosure.

According to some embodiments in this disclosure, the UE 116 is informed about the JPTA operation in order to behave appropriately, e.g., in DCI decoding, or determination of the frequency resources for certain UL channels and signals. For example, the UE 116 receives control signaling and determines whether the control signaling indicates JPTA operation in step 1501. If so, the UE 116 determines to use JPTA operation in step 1502. If not, the UE 116 determines to not use JPTA operation in step 1503.

In one approach, the gNB can indicate the activation of JPTA operation in the RRC configuration. In another approach, the gNB can indicate the activation of JPTA operation (e.g., with 1 bit) in the beam change indication signaling. If the beam change indication is signaled with MAC CE (such as in Rel-15 5G NR), the activation of JPTA operation can be included in the media access control-control channel (MAC CE) signaling. If the beam change indication is signaled with DCI (as supported in Rel-17 5G NR), the activation of JPTA operation can be included in the DCI signaling.

In various embodiments, a JPTA beam and its corresponding frequency resource can be represented as a UL bandwidth part (BWP). To enable JPTA operation for the UE, multiple UL BWPs can be configured to the UE, e.g., by the higher layers such as the RRC signaling. Table 1 shows one example where the UL BWP configuration includes both the BWP assumed for the analog beamforming and for the JPTA beamforming to support dynamic transition of these two modes of operation for the UE for mobility adaptation. The higher layer signaling can include the mapping between a DL beam and a UL JPTA beam in the spatial quasi-colocation property (QCL type D). The JPTA beam and the UL BWP for the UE can be indicated using the beam indication procedure. The signaling to change the serving DL beam for the UE via MAC CE or DCI signaling also indicates the change in the JPTA beam for UL as well as the UL BWP. In effect, when the UE is indicated a BWP corresponding to a JPTA beam, the indication indicates the frequency resource for the relevant UL channels/signals, including PUSCH, PUCCH and SRS.

TABLE 1

BWP indicator to enable JPTA operation

| UL BWP indicator field | UL BWP | Note |
|---|---|---|
| 0 | BWP corresponding to $UL_0$ to $UL_N$ | BWP for analog beamforming (e.g., whole system bandwidth) (N analog beams assumed) |
| 1 | BWP corresponding to $\hat{UL}_{N+1}$ | BWP for JPTA beam 1 (QCL-ed with DL beam N + 1) |
| 2 | BWP corresponding to $\hat{UL}_{N+2}$ | BWP for JPTA beam 2 (QCL-ed with DL beam N + 2) |
| ... | ... | ... |
| M | BWP corresponding to $\hat{UL}_{N+M}$ | BWP for JPTA beam M (QCL-ed with DL beam N + M) |

Figures 16, 17:
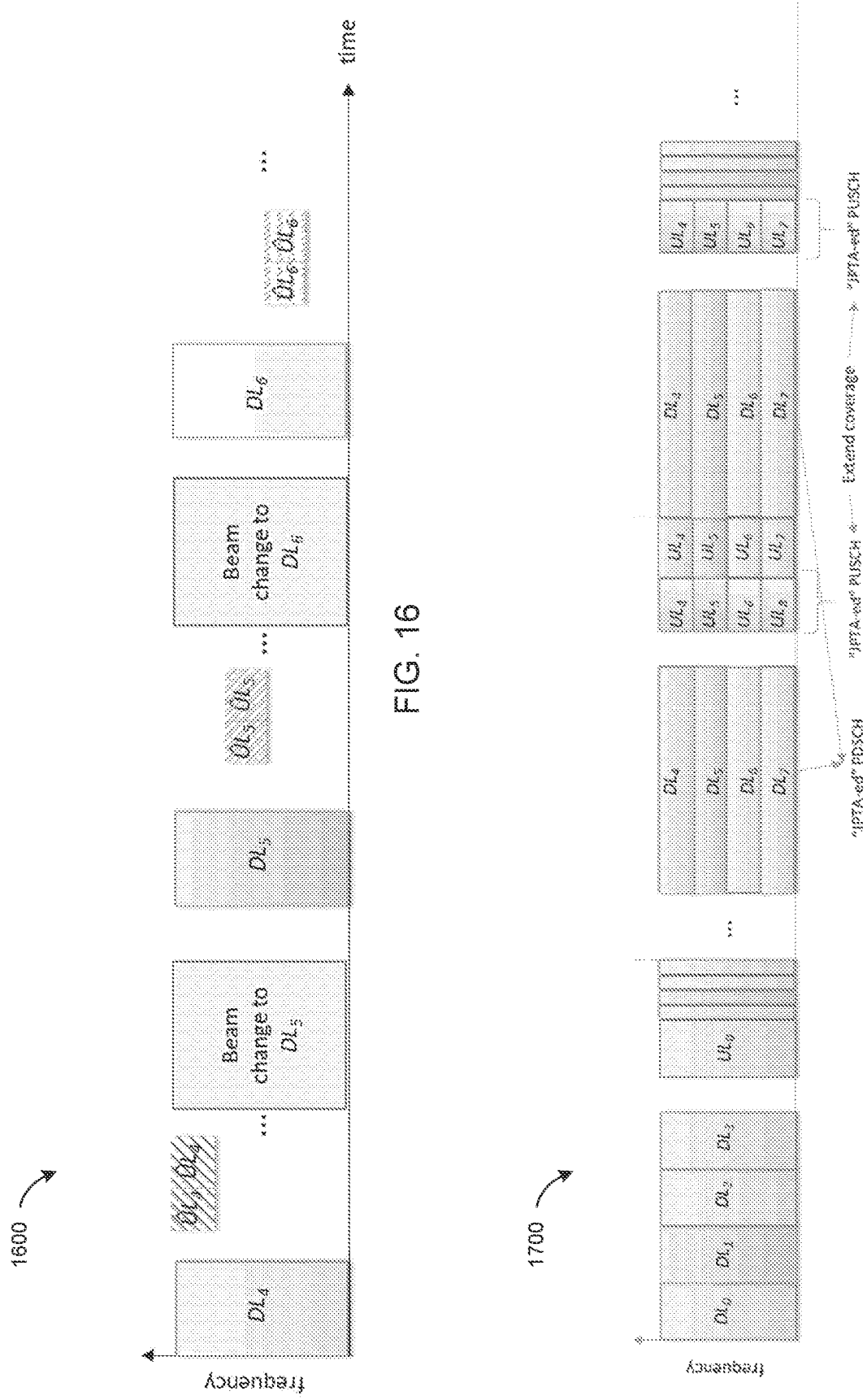
FIG. 16 illustrates an example resource diagram for a JPTA beam changing over time according to various embodiments of the present disclosure.
FIG. 17 illustrates an example resource diagram for JPTA operation for both UL and DL according to various embodiments of the present disclosure.

FIG. 16 illustrates an example resource diagram 1600 for a JPTA beam changing over time according to various embodiments of the present disclosure. The resource diagram 1600 may be used by the BS 102 and UE 116 for beamforming over time. This example resource diagram 1600 is for illustration only and other embodiments can be used without departing from the scope of the present disclosure.

In this embodiment, although multiple UL BWPs are configured to the UE, there can still be one DL BWP configured to the UE. In addition, 5G NR supports up to 4 UL BWPs, additional number of BWPs may be used for JPTA operation (M>4 in Table 1).

FIG. 17 illustrates an example resource diagram 1700 for JPTA operation for both UL and DL according to various embodiments of the present disclosure. The resource diagram 1700 may be used by the BS 102 and the UE 116 for JPTA beamforming in both UL and DL. The resource diagram 1700 is for illustration only and other embodiments can be used without departing from the scope of the present disclosure.

In these illustrative examples, a first set of UEs (i.e., UE's allocated $DL/UL_0$ to $DL/UL_3$) are configured to use the analog beamforming operation, while second set of UEs (i.e., UE's allocated $DL/UL_4$ to $DL/UL_7$) are configured to use the JPTA operation. By doing so, the frequency resource for downlink and uplink is same, and the UE does not have to change the bandwidth in the UL and DL. This could be helpful if $UE_4$ to $UE_7$ do not have high-speed analog to digital converter (ADC)/digital to analog converter (DAC) to support the large bandwidth in DL. The example is for illustration only and other embodiments can be used without departing from the scope of the present disclosure.

For a phased antenna array (PAA), the BS switches among the narrow beams to receive the uplink signal from the UEs. Therefore, each UE can only transmit over a fraction of time, but potentially over the whole bandwidth as determined by the uplink grant. Considering a simple setup where $NU_E$ UEs are dropped in the cell with same distance to the BS and uniform angular spacing, the uplink throughput of each UE is $$R_{PAA} = \frac{W}{N_{UE}} \log(1 + \gamma), \quad (1)$$

where $N_{UE}$ is the number of active UEs, and $$\gamma \triangleq \frac{P_{UE} G_{UE} G_{BS} G_h}{W N_0}$$

is the uplink SNR when the UE is transmitting with power $P_{UE}$ over the whole bandwidth W. $G_{UE}$ ($G_{BS}$) and $G_h$ stands for the beamforming gain at the UE (BS), and the path gain, respectively. $N_0$ represents the power spectrum density of AWGN.

On the other hand, in the JPTA system, the BS can simultaneously serve multiple UEs on different directions at different frequencies. Assume that there are $N_{SZ}$ spatial zones, and each UE can access $$\frac{W N_{SZ}}{N_{UE}}$$

frequency band over $$\frac{1}{N_{SZ}}$$

uplink duration, the uplink throughput of each UE is, $$R_{JPTA} = \frac{W}{N_{UE}} \log(1 - K\gamma) \quad (2)$$

Comparing (1) and (2), there is a power boosting with a factor of K for the JPTA system.

Consider an example for 4 narrow beams for the PAA case and 1 beam for JPTA. In the PAA case, the UE can only transmit in a single timeslot (the 2nd timeslot in the figure). On the other side, the UE in the JPTA case can transmit over 4 timeslots, but only over a quarter of the frequency band. The total radio resource assigned to that UE is the same, however, the UE in the JPTA case delivers 4× more energy to BS than that for PAA, assuming that there is an instantaneous power constraint for UE due to power amplifier and/or RF exposure limits.

The uplink coverage can be defined as the maximum distance where the UE can attain a minimum uplink throughput $R_{min}$, which translates to the minimum SNR requirement as follows, $$\gamma_{PAA} \geq 2^{\frac{KR_{min}}{W}} - 1, \quad (3)$$

$$\gamma_{JPTA} \geq \left(2^{\frac{KR_{min}}{W}} - 1\right). \quad (4)$$

To estimate the uplink coverage, we assume that the largescale path gain is $G_h = \alpha d^{-\beta}$, where $\beta$ is the path loss exponent, and $\alpha$ is the path gain at 1m distance. Thus, the uplink SNR at d is, $$\gamma = \frac{P_{UE} G_{UE} G_{BS} \alpha}{d^\beta W N_0}. \quad (5)$$

The uplink coverage of PAA and JPTA is then, $$d_{PAA} = \left(\frac{P_{UE} G_{UE} G_{BS} \alpha}{W N_0 \left(2^{\frac{KR_{min}}{W}} - 1\right)}\right)^{1/\beta}, \quad (6)$$

$$d_{JPTA} = \left(\frac{K P_{UE} G_{UE} G_{BS} \alpha}{W N_0 \left(2^{\frac{KR_{min}}{W}} - 1\right)}\right)^{1/\beta} = K^{\frac{1}{\beta}} d_{PAA}. \quad (7)$$

We can see from (7) that the JPTA system increases the uplink coverage radius by a factor $K^{1/\beta}$. The coverage area is then extended by a factor $K^{2/\beta}$, implying the BS deployment density could be reduced by the same factor. The coverage radius and area extension with K is illustrated in FIG. 104. It is seen that the K-times uplink SNR gain is translated to the coverage radius and area extension. For example, when there are 32 UEs in the cell, and $\beta=3$, the coverage radius increases by a factor $32^{1/3} \approx 3.17$; the coverage area increases by a factor $32^{2/3} \approx 10.08$; and the BS density can decrease to about 10%, which means a network installation cost saving of 90%! Although this is an idealized example, the advantage in uplink coverage extension is clearly significant.

Note that to achieve the coverage extension promised by JPTA, UE has to transmit over a longer duration in the uplink. This could cause UE overheating, which in turn forces UE to stop uplink transmission early or reduce the transmission power. In addition, the maximum permissible exposure (MPE) requirement of the handheld phone by regulators, e.g., FCC, could also limit the uplink transmission power or duty cycle. Our analysis ignores these effects by assuming that the overheating can be resolved by better cooling technology or better power saving method in the future, and the uplink power is not too high to exceed the MPE limit.

Note that for the downlink transmission, the JPTA throughput is the same as the phased antenna array throughput, $$R^{DL}_{JPTA} = R^{DL}_{PAA} = \frac{W}{N_{UE}} \log(1 + \gamma_{DL}) \quad (8)$$

where $$\gamma_{DL} \triangleq \frac{P_{UE} G_{UE} G_{BS} G_h}{W N_0}$$

is the downlink SNR. Here we ignore the beam squint effect of PAA, which will only degrade the throughput of PAA.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS), comprising:
   a processor configured to:
      identify criteria associated with a set of user equipments (UEs) in a cell of the BS, wherein the criteria include an uplink (UL) signal strength metric for each UE in the set of UEs, and
      determine, based on the criteria, a first subset of the set of UEs to use a joint phase-time array (JPTA) beamforming for coverage enhancement including to determine to include a first UE in the first subset of UEs to use the JPTA beamforming for coverage enhancement based on comparison of the UL signal strength metric of the first UE to a threshold; and
   a transceiver operably coupled to the processor, the transceiver configured to:
      use the JPTA beamforming for signaling with the first subset of UEs, and
      use an analog beamforming for signaling with a second subset of UEs in the set of UEs.

2. The BS of claim 1, wherein the processor is further configured to determine, for the first UE in the set of UEs, the UL signal strength metric based on measurement of an UL signal received from the first UE.

3. The BS of claim 1, wherein the processor is further configured to:
   perform a beam management procedure based on UL signals received from a second UE in the set of UEs,
   determine, based on the beam management procedure, a beam to use to receive an UL transmission from the second UE, and determine to include the second UE in the first subset of UEs to use the JPTA beamforming based on identification that the determined beam is a JPTA beam.

4. The BS of claim 1, wherein the transceiver is further configured to transmit, to one or more UEs in the first subset of UEs, information indicating that the JPTA beamforming to transmit on a first set of UL symbols and to use the analog beamforming to transmit on a second set of UL symbols.

5. The BS of claim 1, wherein:
the transceiver is further configured to transmit, to one or more UEs in the first subset of UEs, information indicating to use the JPTA beamforming, and
the information is included in at least one of a radio resource control configuration, a beam change indication, a media access control-control channel, or downlink control information.

6. The BS of claim 1, wherein the transceiver is further configured to transmit, to one or more UEs in the first subset of UEs, information indicating to use the JPTA beamforming for an uplink transmission and a downlink reception on a same frequency resource.

7. The BS of claim 1, wherein the first subset of UEs is associated with an edge of the cell.

8. A user equipment (UE), comprising:
a transceiver configured to;
transmit an uplink (UL) signal to a base station (BS), and
receive, from the BS, information regarding whether to use joint phase-time array (JPTA) beamforming; and
a processor operably coupled to the transceiver, the processor configured to determine, based on the information, whether to use the JPTA beamforming for coverage enhancement or analog beamforming, wherein whether the UE is to use the JPTA beamforming is based on comparison of an UL signal strength metric associated with the UL signal to a threshold,
wherein, when the information indicates to use the JPTA beamforming, the transceiver is further configured to use the JPTA beamforming for signaling with the BS, and
wherein, when the information indicates to use the analog beamforming, the transceiver is further configured to use the analog beamforming for the signaling with the BS.

9. The BS of claim 1, wherein the transceiver is further configured to:
use the JPTA beamforming for signaling with the first subset of UEs in a first portion of a slot, and
use the analog beamforming for signaling with the second subset of UEs in a second portion of the slot.

10. The UE of claim 8, wherein the processor is further configured to:
perform a beam management procedure with the BS based on UL signals transmitted by the transceiver, and
determine, as a result of the beam management procedure, a beam to use for the signaling with the BS,
wherein whether the UE is to use the JPTA beamforming is based on whether the determined beam is associated with a JPTA beam.

11. The UE of claim 8, wherein the information indicates to use the JPTA beamforming to transmit on a first set of UL symbols and to use the analog beamforming to transmit on a second set of UL symbols.

12. The UE of claim 8, wherein:
the information indicates to use the JPTA beamforming, and
the information is included in at least one of a radio resource control configuration, a beam change indication, a media access control-control channel, or downlink control information.

13. The UE of claim 8, wherein the information indicates to use the JPTA beamforming for an uplink transmission and a downlink reception on a same frequency resource.

14. The UE of claim 8, wherein:
the information indicates to use the JPTA beamforming, and
the UE is associated with an edge of a cell of the BS.

15. A method for operating a base station (BS), the method comprising:
identifying criteria associated with a set of user equipments (UEs) in a cell of the BS, wherein the criteria include an uplink (UL) signal strength metric for each UE in the set of UEs;
determining, based on the criteria, a first subset of the set of UEs to use a joint phase-time array (JPTA) beamforming for coverage enhancement including to determine to include a first UE in the first subset of UEs to use the JPTA beamforming for coverage enhancement based on comparison of the UL signal strength metric of the first UE to a threshold;
using the JPTA beamforming for signaling with the first subset of UEs; and
using an analog beamforming for signaling with a second subset of UEs in the set of UEs.

16. The method of claim 15, wherein the method further comprises determining, for the first UE in the set of UEs, the UL signal strength metric based on measurement of an UL signal received from the first UE.

17. The method of claim 15, further comprising:
performing a beam management procedure based on UL signals received from a second UE in the set of UEs;
determining, based on the beam management procedure, a beam to use to receive an UL transmission from the second UE; and
determining to include the second UE in the first subset of UEs to use the JPTA beamforming based on identification that the determined beam is a JPTA beam.

18. The method of claim 15, further comprising transmitting, to one or more UEs in the first subset of UEs, information indicating that the JPTA beamforming to transmit on a first set of UL symbols and to use the analog beamforming to transmit on a second set of UL symbols.

19. The method of claim 15, further comprising:
transmitting, to one or more UEs in the first subset of UEs, information indicating to use the JPTA beamforming, wherein the information is included in at least one of a radio resource control configuration, a beam change indication, a media access control-control channel, or downlink control information.

20. The method of claim 15, further comprising transmitting, to one or more UEs in the first subset of UEs, information indicating to use the JPTA beamforming for an uplink transmission and a downlink reception on a same frequency resource.

* * * * *